US008086283B2

(12) United States Patent
Parker et al.

(10) Patent No.: US 8,086,283 B2
(45) Date of Patent: Dec. 27, 2011

(54) WIRELESS CHILD COMMUNICATION DEVICE

(76) Inventors: Stephen B. Parker, McLean, VA (US); Robert I. Berg, Honolulu, HI (US)

( * ) Notice: Subject to any disclaimer, the term of this patent is extended or adjusted under 35 U.S.C. 154(b) by 1170 days.

(21) Appl. No.: 10/636,916

(22) Filed: Aug. 8, 2003

(65) Prior Publication Data

US 2004/0132480 A1 Jul. 8, 2004

Related U.S. Application Data

(60) Provisional application No. 60/401,748, filed on Aug. 8, 2002.

(51) Int. Cl.
*H04M 1/00* (2006.01)
(52) U.S. Cl. ................... 455/575.1; 379/433.06
(58) Field of Classification Search .............. 455/565, 455/411, 458
See application file for complete search history.

(56) References Cited

U.S. PATENT DOCUMENTS

| | | | |
|---|---|---|---|
| 4,866,764 A * | 9/1989 | Barker, III | ............ 379/355.01 |
| 6,073,034 A | 6/2000 | Jacobsen | |
| 6,085,109 A | 7/2000 | Koga | |
| 6,091,947 A | 7/2000 | Sumner | |
| 6,091,965 A | 7/2000 | Voroba | |
| 6,101,401 A | 8/2000 | Mou | |
| 6,115,412 A | 9/2000 | Vanderpool | |
| 6,115,598 A | 9/2000 | Yu | |
| 6,115,612 A | 9/2000 | Fukuda | |
| 6,118,981 A | 9/2000 | Ohmori | |
| 6,125,287 A | 9/2000 | Cushman | |
| 6,128,475 A | 10/2000 | Wicks | |
| 6,128,515 A | 10/2000 | Kabler | |
| 6,131,028 A | 10/2000 | Whitington | |
| 6,134,421 A | 10/2000 | Lee | |
| 6,138,008 A | 10/2000 | Dunn | |
| 6,138,016 A | 10/2000 | Kulkarni | |
| 6,138,036 A | 10/2000 | O'Cinneide | |
| 6,141,570 A | 10/2000 | O'Neill, Jr. | |
| 6,144,840 A | 11/2000 | Alton | |
| 6,144,847 A | 11/2000 | Altschul | |
| 6,149,353 A | 11/2000 | Nilsson | |
| 6,151,503 A | 11/2000 | Chavez | |
| 6,151,510 A | 11/2000 | Zicker | |
| 6,163,682 A | 12/2000 | Lee | |
| 6,163,703 A | 12/2000 | Lee | |
| 6,169,891 B1 | 1/2001 | Gorham | |
| 6,173,195 B1 | 1/2001 | Chen | |
| 6,188,875 B1 | 2/2001 | Evans | |
| 6,188,888 B1 | 2/2001 | Bartle | |
| 6,195,535 B1 | 2/2001 | Kurchuk | |
| 6,195,541 B1 | 2/2001 | Griffith | |
| 6,195,542 B1 | 2/2001 | Griffith | |
| 6,195,558 B1 | 2/2001 | Griffith | |
| 6,212,398 B1 | 4/2001 | Roberts | |
| 6,212,403 B1 | 4/2001 | Ushiroda | |

(Continued)

OTHER PUBLICATIONS

AOL, Parental Contols, 2000,America Online, Inc. 5.0 pp. 1 and 2.*

(Continued)

*Primary Examiner* — Marcos Batista
(74) *Attorney, Agent, or Firm* — Westerman, Hattori, Daniels & Adrian, LLP

(57) ABSTRACT

A wireless child phone that includes means for making calls to only a preset set of individuals and/or means for receiving calls from only a preset set of individuals.

42 Claims, 4 Drawing Sheets

U.S. PATENT DOCUMENTS

| | | | |
|---|---|---|---|
| 6,216,000 | B1 | 4/2001 | Blumhardt |
| 6,223,021 | B1 | 4/2001 | Silvia |
| 6,226,411 | B1 | 5/2001 | Hiyoshi |
| 6,230,003 | B1 | 5/2001 | Macor |
| 6,233,337 | B1 | 5/2001 | Etzel |
| 6,236,326 | B1 | 5/2001 | Murphy |
| 6,236,857 | B1 | 5/2001 | Calabrese |
| 6,243,593 | B1 | 6/2001 | Zicker |
| 6,246,868 | B1 | 6/2001 | Bullock |
| 6,249,684 | B1 | 6/2001 | Hasegawa |
| D445,777 | S * | 7/2001 | Scalisi .................. D14/191 |
| 6,256,516 | B1 | 7/2001 | Wagner |
| 6,272,327 | B1 | 8/2001 | Kurchuk |
| 6,282,416 | B1 | 8/2001 | Verdonk |
| 6,292,662 | B1 | 9/2001 | Ziv |
| 6,292,674 | B1 | 9/2001 | Davis |
| 6,292,675 | B1 | 9/2001 | Nilsson |
| 6,298,250 | B1 | 10/2001 | Nilsson |
| 6,308,053 | B1 | 10/2001 | Nilsson |
| 6,311,071 | B1 | 10/2001 | Voroba |
| 6,327,476 | B1 | 12/2001 | Koscal |
| 6,332,084 | B1 | 12/2001 | Shaanan |
| 6,334,054 | B1 | 12/2001 | Link |
| 6,351,629 | B1 | 2/2002 | Altschul |
| 6,356,538 | B1 | 3/2002 | Li |
| 6,356,752 | B1 | 3/2002 | Griffith |
| 6,366,568 | B1 | 4/2002 | Bolgiano |
| 6,377,798 | B1 | 4/2002 | Shaffer |
| 6,377,822 | B1 | 4/2002 | Grimes |
| 6,381,470 | B1 | 4/2002 | Griffith |
| 6,382,507 | B2 | 5/2002 | Schilling |
| 6,393,269 | B1 | 5/2002 | Hartmaier |
| 6,397,084 | B1 | 5/2002 | Wicks |
| 6,400,964 | B1 | 6/2002 | Zicker |
| 6,400,967 | B1 | 6/2002 | Nilsson |
| 6,405,029 | B1 | 6/2002 | Nilsson |
| 6,405,031 | B1 | 6/2002 | Altschul |
| 6,405,056 | B1 | 6/2002 | Altschul |
| 6,411,632 | B2 | 6/2002 | Lindgren |
| 6,411,802 | B1 | 6/2002 | Cardina |
| 6,415,142 | B1 | 7/2002 | Martineau |
| 6,418,224 | B1 | 7/2002 | Etzel |
| 6,421,546 | B1 | 7/2002 | Tsao |
| 6,434,365 | B1 | 8/2002 | Knutson |
| 6,434,403 | B1 | 8/2002 | Ausems |
| 6,449,483 | B1 | 9/2002 | Akhteruzzaman |
| 6,453,182 | B1 | 9/2002 | Sprigg |
| 6,466,796 | B1 | 10/2002 | Jacobson |
| 6,466,800 | B1 | 10/2002 | Sydon |
| 6,473,610 | B1 | 10/2002 | Nilsson |
| 6,487,401 | B2 | 11/2002 | Suryanarayana et al. |
| 6,487,422 | B1 | 11/2002 | Lee |
| 6,496,691 | B1 | 12/2002 | Easley |
| 6,498,930 | B1 | 12/2002 | Mamaghani |
| 6,498,938 | B1 | 12/2002 | Morrow, Sr. |
| 6,510,324 | B2 | 1/2003 | Fukumura |
| 6,519,480 | B1 | 2/2003 | Wicks |
| 6,522,879 | B2 | 2/2003 | Myer |
| 6,529,743 | B1 | 3/2003 | Thompson |
| 6,573,835 | B2 * | 6/2003 | Irizarry et al. .......... 340/573.4 |
| 6,577,861 | B2 | 6/2003 | Ogasawara |
| 6,580,927 | B1 | 6/2003 | Nilsson |
| 6,584,327 | B1 | 6/2003 | Nilsson |
| 6,587,679 | B1 | 7/2003 | Hokao |
| 6,587,684 | B1 | 7/2003 | Hsu |
| 6,597,905 | B1 | 7/2003 | Hijii |
| 6,603,981 | B1 | 8/2003 | Carillo, Jr. |
| 6,738,901 | B1 * | 5/2004 | Boyles et al. ................ 713/159 |
| 6,785,387 | B1 * | 8/2004 | Albrecht et al. ......... 379/433.06 |
| 6,792,298 | B1 * | 9/2004 | Tasto ........................ 455/575.8 |
| 6,826,120 | B1 * | 11/2004 | Decker et al. ................. 368/10 |
| 6,871,082 | B2 * | 3/2005 | Cox et al. ...................... 455/565 |
| 6,912,399 | B2 * | 6/2005 | Zirul et al. .................... 455/463 |
| 2002/0009990 | A1 * | 1/2002 | Kleier et al. .................. 455/416 |
| 2002/0098874 | A1 * | 7/2002 | Zirul et al. ................... 455/564 |
| 2003/0045279 | A1 * | 3/2003 | Shostak ........................ 455/422 |
| 2003/0204568 | A1 * | 10/2003 | Bhargava et al. ............. 709/206 |
| 2004/0002343 | A1 * | 1/2004 | Brauel et al. ............... 455/456.1 |
| 2004/0180668 | A1 * | 9/2004 | Owens et al. .............. 455/456.1 |

OTHER PUBLICATIONS

Oishi et. al., "High Performance GaN Transistors with Ion Implantation Doping", Mitsubishi Denki Giho, Aug. 2005, Feature Paper 07, p. 537.

Moon et. al., "55% PAE and High Power Ka-Band GaN HEMTs with Linearized Transconductance via n+GaN Source Contact Ledge", IEEE Electron Device Letters, vol. 29, No. 8, 2008, pp. 834-837.

* cited by examiner

WIRELESS CHILD COMMUNICATION DEVICE

Priority is claimed to U.S. Provisional Application No. 60/401,748 filed on Aug. 8, 2002, the entire disclosure of which is incorporated herein by reference.

The present invention relates to improvements in wireless communications, such as telephones. The preferred embodiments are explained in the attachments. Embodiments of the invention may be constructed using known technologies, such as various technologies employed in existing telephone systems, such as that by SPRINT, QUALCOM, PALM and many other wireless telephone, wireless Personal Data Assistants (PDAs) and the like. In some embodiments, technology employed in the JPHONE wireless devices can be employed—e.g., such devices having recently become popular in JAPAN, for example. In that regard, some illustrative devices are shown in the attached documents (see above Provisional Application). The present invention may employ technology within such and other devices, such as underlying communications structures and such as various features disclosed in such materials.

BRIEF DESCRIPTION OF THE DRAWINGS

The following is a brief description of the drawings of this application which are described in the detailed description of this application.

Figure 1:
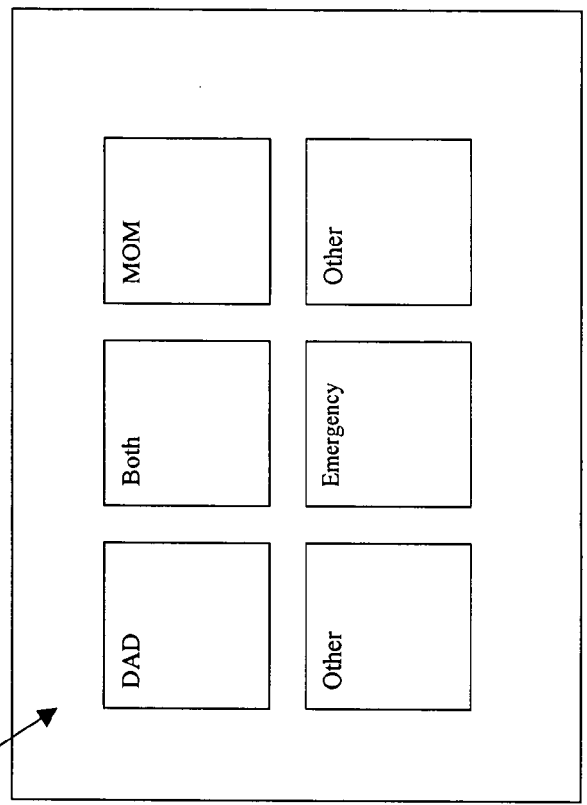
FIG. 1 shows a front view of a wireless phone according to some illustrative embodiments.

Description Related to, E.G., FIG. 1:

FIG. 1 shows a front view of a wireless phone according to some illustrative embodiments. In the illustrated embodiment, a plurality of keys (six in the illustrated embodiment) are shown. Here, the keys are limited and programmed to call specific individual and/or a specific group of individuals (i.e., conference-calling or multi-way calls—such as, e.g., shown at "both" which can be, e.g., a conference call to both the "mom" and "dad" or the like). Preferably, the keys have pictures such as photographs designating callee to facilitate use by non-reading children.

In some examples, pictures can be located physically on the keys and/or can be displayed on a screen. In some embodiments, the keys can be provided on a touch screen in which a user can physically to an image on the screen. In some embodiments, images on the screen can be replaced, such as, e.g., by taking a digital photograph with the camera and storing the same for display at a location on the touch screen.

Figure 2:
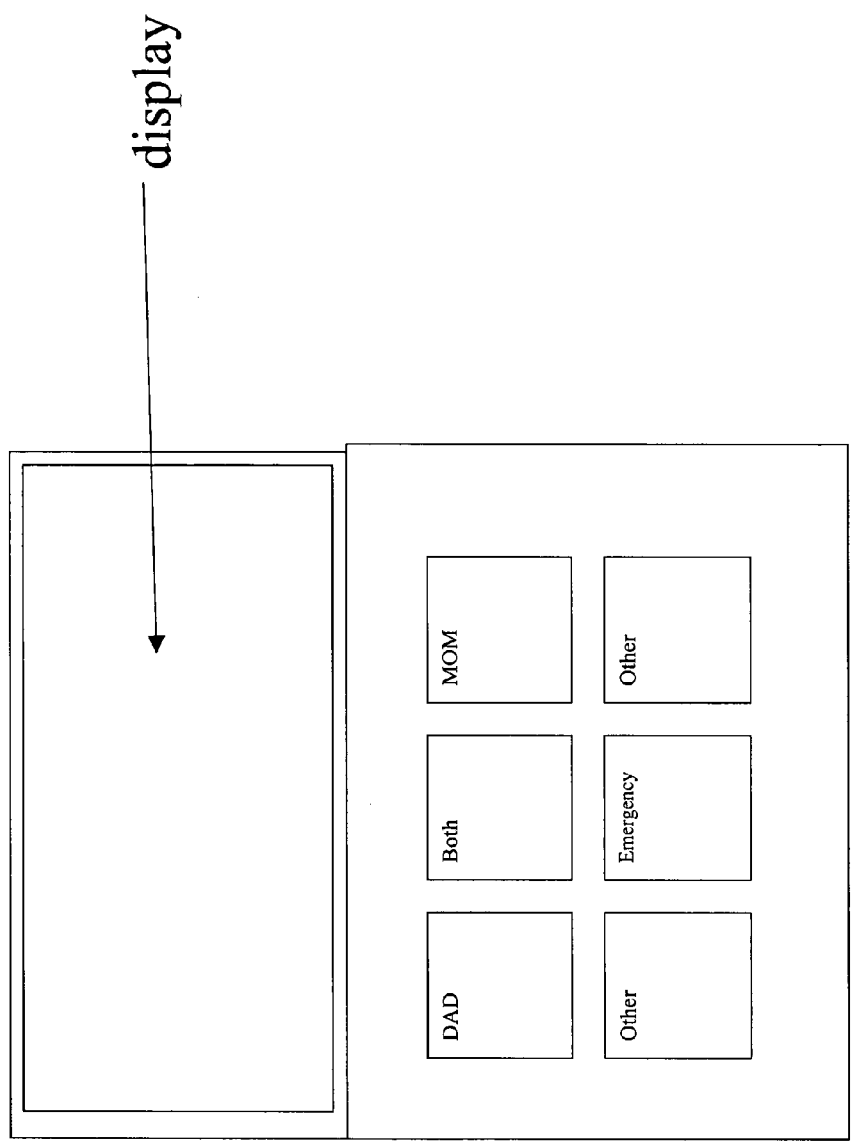
FIG. 2 shows another illustrative embodiment of a wireless phone with a display screen located proximate keys of the phone.

Description Related to, E.G., FIG. 2:

FIG. 2 shows another embodiment of a wireless phone with a display screen located proximate keys of the phone. For example, the display can be used to display a picture to be shown. In addition, the display can be used as a video phone display. In addition, the display can be used to display a digitally stored picture upon clicking a button or key—such as, e.g., displaying an entered electronic photograph to help a user identify a key to push.

In some embodiments, a common telephone (e.g., having a common key pad with digits 0-9 and * and # keys could be modified to incorporate features described herein. For example, a cover plate can be provided over a common phone that covers one or more button to present only buttons or keys for use by child. This could even be applied to a normal phone so as to reveal, for example, only a few keys. In this manner, some embodiments of the invention could be employed by readily modifying existing phones.

Figure 3:
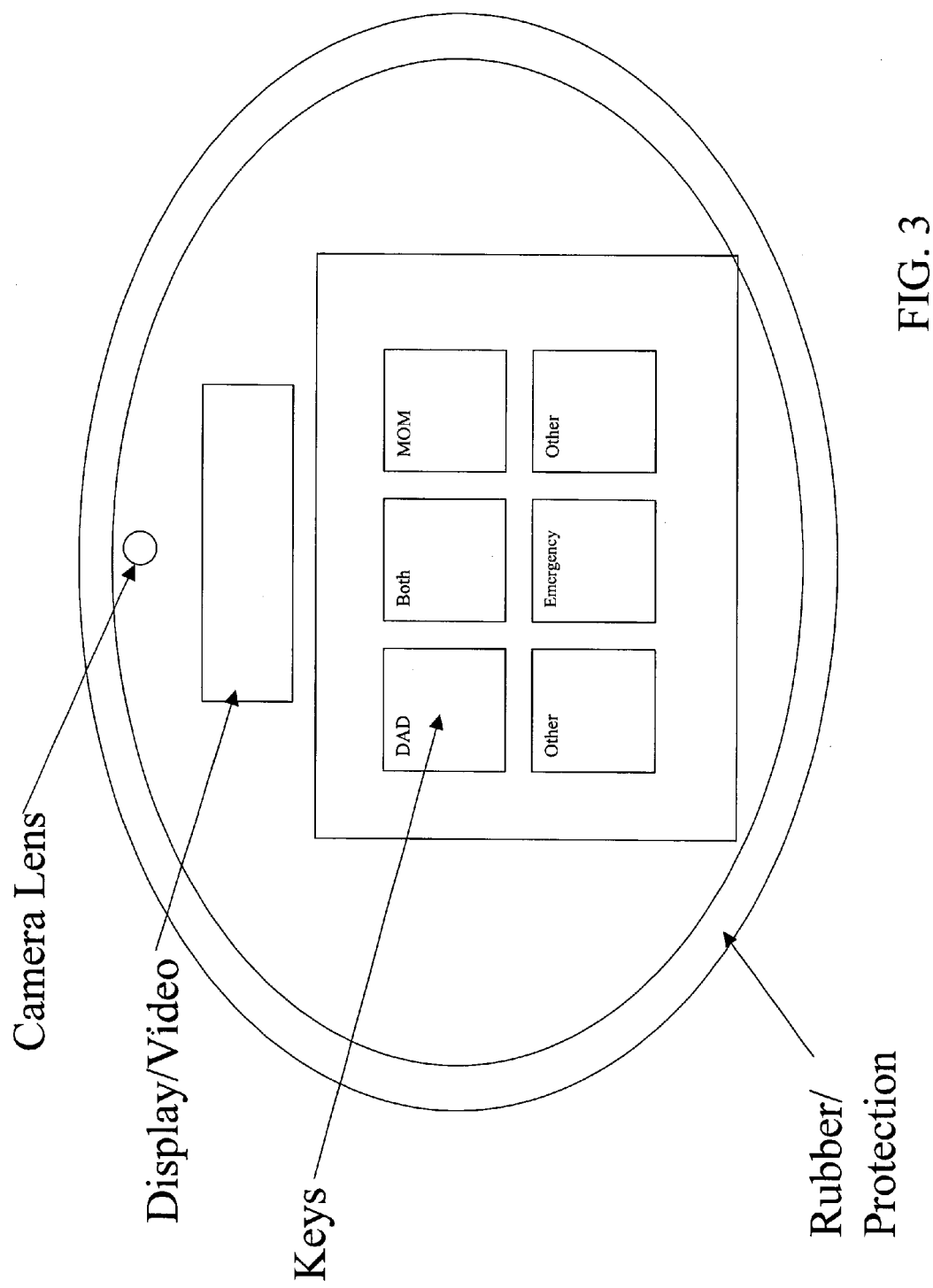
FIG. 3 shows other illustrative embodiments of a wireless phone including, e.g., a camera, a display and/or video, and also depicts an illustrative protective rubber shroud.

Description Related to, E.G., FIG. 3:

FIG. 3 shows embodiments including a camera lens, a display and/or video portion for visual display of digitally stored images and/or video, a plurality of keys (six in the illustrated embodiment), and a protective rubber or foam rubber or the like shroud around a perimeter to protect the telephone upon dropping the same. In some preferred embodiments, the rubber can be a substantial thickness in proportion to the dimension of the telephone, such as, e.g., about the thickness shown.

FEATURES IN ILLUSTRATIVE EMBODIMENTS

Emergency Key Function:

In some illustrative embodiments, one key labeled "emergency" can be set to call a preset emergency number. In some embodiments, the number called can be a call to 911. In some embodiments, the number called can be a conference call to Mom and Dad. And, in some embodiments, if no answer is made by either Mom or Dad, the call will preferably be rolled over or forwarded to 911 as back-up (e.g., within a preset time as would be understood based on this disclosure). In some embodiments, this key can establish a conference call to Mom and Dad and other(s) and, preferably, if there is no answer by any, it can be made to call to 911. In some embodiments, the call can be a conference call to each of Mom and Dad and 911 (in some embodiments, others could be conferenced in too).

Conference calls to 911 and to other individuals could help ensure that improper calls to 911 are avoided and/or thwarted. In some embodiments, a parent or the like could be able to remotely control the telephone (e.g., by pressing a particular key on the parent's phone during a call to cause the telephone to perform a function, such as, e.g.: a) to automatically disconnect [e.g., which a call is wrongly made to 911], b) to send a digital photograph [e.g., to the parent's phone and/or to a number, URL or email address, such as, e.g., if the phone is web enabled pre-identified and/or programmed by keys at the parent's phone and/or via an internet web site or the like], c) or other function.]).

In some embodiments, such as, e.g., addressed below, a central service can establish an independent emergency number that can be used to pre-screen emergency calls from the child phone. For example, this could be a telephone number established by the issuer of the child phone. In some embodiments, this number could even be a confidential number that is merely stored in the child's phone so as to inhibit contact be other individuals and limit undesired use other than with the child's phone.

Camera Function:

In some embodiments, a camera function can be provided. In some embodiments, the phone itself can include a key for pressing to send a picture. In some embodiments, the picture can sent via e-mail and/or one can otherwise transmit a picture. In some embodiments, this can enable sending of picture to, e.g., Mom, Dad, Other and/or Emergency e-mail addresses. For example, in some embodiments, a user (e.g., a child) can press a picture button and have a picture in que and then sent upon clicking a button for a respective callee (e.g.

Mom, Dad, Other, and/or Emergency callees). In some embodiments, Mom, Dad and/or other and/or Emergency System Personel (e.g., if a system is set up to monitor, e.g., the child using the phone) can send A) automatic e-mail photo request whereby the child's phone is called and a photo is automatically sent to requested location.

Calling/Receiving Features:

In preferred embodiments, the child phone can receive calls only by: Mom, Dad, Other and/or Emergency callers. As would be understood based on this disclosure, by way of example, a caller ID function could be used that merely allows calls from a few preset numbers applicable to specific callees. In some examples, a system can be established to help locate children or the like (e.g., such as, e.g., which may manage a large number of child phone users or all child phone users simultaneously). In some cases, the phone can have buttons flash (or otherwise be visibly indicated) for who is calling and the child can readily press a respective button to answer the phone. In some cases, the child can readily answer by pressing a single answer button (preferably, the identity of the caller will be visible identified to the child).

In some cases, the apparatus can have an automatic answer at the child's phone. Preferably, in these instances, the child phone will have a speaker or page feature so that the callee can page thru such that parent or the like is audible to child without child answering.

Preferably, a parent or the like controls child's phone unit, such as by entering information on a website and/or even by calling the child's phone directly and entering a password and getting menu options. For instance, the parent and/or the like can preferably change numbers that the child's phone would call for various key entries—such as, e.g., MOM, DAD, OTHER, ETC. (e.g., this would be unnoticed by child that would reach parent no matter what). Also, preferably a parent could change buttons to generate multiple calls (i.e., conference multiple numbers) to reach the parent, such as by calling home, office, cell phone and/or other numbers concurrently to attempt to reach that parent.

Thus, the cell phone would preferably be remotely programmable. In some embodiments, the child's phone could be programmed directly (such as by including a removable plate that covers a key pad or the like). However, it is preferably remotely programmed.

Figure 4:
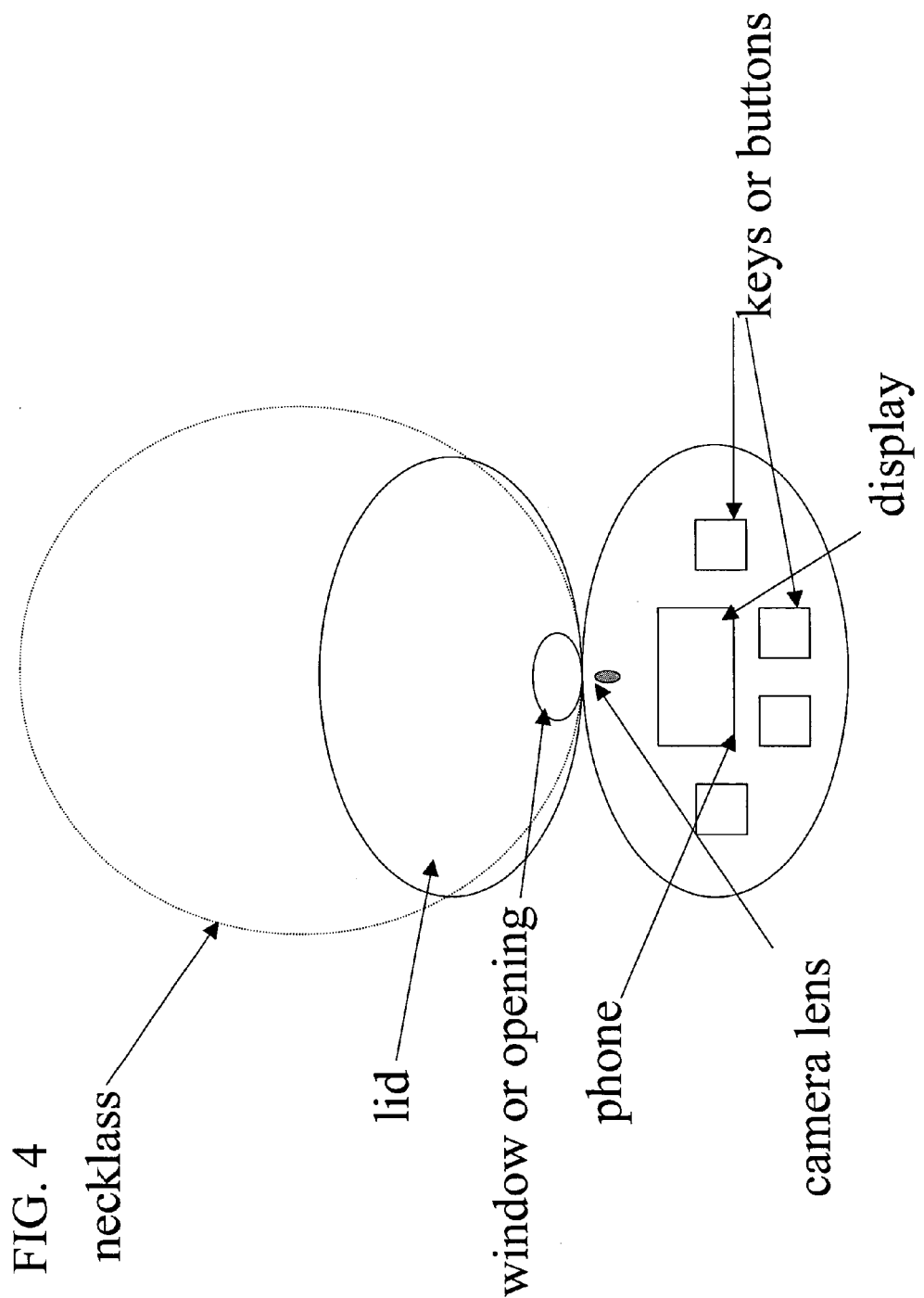
FIG. 4 shows other illustrative embodiments of a wireless phone including, e.g., a cover or lid, a holder chord or necklace for supporting upon a user, a display, and a camera.

Description Related to, E.G., FIG. 4:

In some embodiments, the child phone can have a cover or lid. Preferably, upon opening the cover, the phone can power to an active mode. In some embodiments, the child can then verbally call by saying, e.g., a parents name.

In some embodiments, a call will automatically be made upon opening the cover or lid. In some embodiments, a call will automatically be made to one individual or group, unless w/in a predetermined time (e.g., 5-10 seconds) entry is made to make a call to another individual or group. For example, if a child opens the phone, a call could automatically be directed to a MOM and/or DAD, unless the child identifies another particular number.

In some embodiments, the parent can select one or more "other" key for the child to call. Here, for example, a child may be able to call a care giver, a friend of the child (perhaps on another child phone), and/or any other desired individual. Preferably, the child will have a small number of "other" callee keys (such as, e.g., only one key as shown in some of the figures).

In some embodiments, a necklass can be used to support the phone so as to rest or attach to a child's chest region facing outward in normal use. In other embodiments, the phone can include a holder that is clipped to a child's clothing and the phone can be removed therefrom. In some embodiments, the phone is on a short retract-able chord connected to the holder. The chord is preferably too short to extend around a child's neck, but long enough to bring phone into view. In some embodiments, the phone includes a camera facing outwards in normal use (e.g., when worn). In some embodiments, the phone can be programmed to send images to another phone or to a server (such as, e.g., a server communicating via the Internet) or the like (such as when requested via a parent's phone or the like).

In some embodiments, the camera lens is mounted in normal use on a child so as to face outward and thus provide outward images. In some embodiments, the lid includes a window or opening to enable camera to view therethrough. In some embodiments, when a child picks up the phone during use, the camera will face the child and thus take images of the child's face. In some embodiments, the camera can provide a wide angle image (or a wide angle image lens can be included) to ensure a wide view for discerning environment. The wide view is preferably over 90 degrees and more preferably over 120 degrees and more preferably near 180 degrees or more (possibly over 270 degrees for example) in one or preferably in two coordinate directions. While a wide angle image may be undesirable in other contexts since it may not create an aesthetically pleasant image, it can be advantageous as a monitoring tool.

Known Wireless Communications:

As would be understood based on this disclosure, the child phone would include features inherent in wireless phone technology, such as, e.g., receiving modules, transmission modules, processors, etc. Embodiments of the invention can include, e.g., appropriate communications technology as shown, e.g., the following patents, depending on circumstances, the entire disclosures of which patents are incorporated herein by reference.

1 U.S. Pat. No. 6,603,981 Device for radiation shielding of wireless transmit/receive electronic equipment such as cellular telephone from close proximity direct line-of-sight electromagnetic fields 2 U.S. Pat. No. 6,597,905 Cordless telephone system and method for transferring caller line identification information to wireless remote handsets 3 U.S. Pat. No. 6,587,684 Digital wireless telephone system for downloading software to a digital telephone using wireless data link protocol 4 U.S. Pat. No. 6,587,679 Apparatus for scanning input signals in wireless telephone and method of doing the same 5 U.S. Pat. No. 6,584,327 Mobile telephone instruments and wireless telecommunications system 6 U.S. Pat. No. 6,580,927 Wireless mobile telephone system with voice-dialing telephone instruments and DTMF capability 7 U.S. Pat. No. 6,577,861 Electronic shopping system utilizing a program downloadable wireless telephone 8 U.S. Pat. No. 6,529,743 Universal wireless telephone to modem adapter 9 U.S. Pat. No. 6,522,879 Two-way telephone and two-way paging service on the same wireless infrastructure 10 U.S. Pat. No. 6,519,480 Wireless telephone with virtual dialer 11 U.S. Pat. No. 6,510,324 Wireless telephone apparatus 12 U.S. Pat. No. 6,498,938 Wireless telephone-to-wired telephone system interfacing 13 U.S. Pat. No. 6,498,930 Method for automatically programming a wireless telephone with a voice mail system access number 14 U.S. Pat. No. 6,496,691 Enhanced call return in a wireless telephone network 15 U.S. Pat. No. 6,487,422 Wireless telephone having remote controller function 16 U.S. Pat. No. 6,487,401 Prepaid wireless telephone account regeneration in a wireless access protocol system 17 U.S. Pat. No. 6,473,610 Wireless prepaid telephone system with dispensable instruments 18 U.S. Pat. No. 6,466,800 Method and system for a wireless communication system incorporating channel selection algorithm for 2.4 GHz direct sequence spread spectrum cordless telephone system 19 U.S. Pat. No. 6,466,796 System for providing location based service to a wireless telephone set in a telephone system 20 U.S. Pat. No. 6,453,182 Wireless telephone airplane and alarm clock modes 21 U.S. Pat. No. 6,449,483 Wireless telephone system for accessing multiple stations via a single telephone number 22 U.S. Pat. No. 6,434,403 Personal digital assistant with wireless telephone 23 U.S. Pat. No. 6,434,365 Providing initial power estimate to wireless telephone handsets 24 U.S. Pat. No. 6,421,546 Signal transmission circuit of a wireless telephone handset 25 U.S. Pat. No. 6,418,224 Methods and apparatus for self-inverting multiple-iteration CMEA crypto-processing for improved security for wireless telephone messages 26 U.S. Pat. No. 6,415,142 Prepaid smart card in a GSM based wireless telephone network and method for operating prepaid cards 27 U.S. Pat. No. 6,411,802 Wireless backup telephone device 28 U.S. Pat. No. 6,411,632 Network hub for interconnecting a wireless office environment with a public cellular telephone network 29 U.S. Pat. No. 6,405,056 Compact wireless telephone with enabling module 30 U.S. Pat. No. 6,405,031 Wireless telephone system, telephone and method 31 U.S. Pat. No. 6,405,029 Wireless prepaid telephone system with dispensable instruments 32 U.S. Pat. No. 6,400,967 Mobile keyless telephone instruments and wireless telecommunications system having voice dialing and voice programming capabilities 33 U.S. Pat. No. 6,400,964 Module for providing wireless call communication services through wire-connected telephone equipment 34 U.S. Pat. No. 6,397,084 Wireless telephone with metered shuttle on face 35 U.S. Pat. No. 6,393,269 Signaling system and method for network-based pre-paid wireless telephone service 36 U.S. Pat. No. 6,382,507 Wireless telephone debit card system and method 37 U.S. Pat. No. 6,381,470 Automatic reassignment of a telephone number of a wireless terminal based on location of the wireless terminal 38 U.S. Pat. No. 6,377,822 Wireless telephone for visually displaying progress messages 39 U.S. Pat. No. 6,377,798 System and method for improved wireless telephone call reception notification 40 U.S. Pat. No. 6,366,568 Transfer station for wireless telephone distribution system with time and space diversity transmission 41 U.S. Pat. No. 6,356,752 Wireless telephone as a transaction device 42 U.S. Pat. No. 6,356,538 Partial sleep system for power savings in CDMA wireless telephone devices 43 U.S. Pat. No. 6,351,629 Compact modular wireless telephone 44 U.S. Pat. No. 6,334,054 Wireless telephone with improved pager mode 45 U.S. Pat. No. 6,332,084 Multiple mode wireless telephone 46 U.S. Pat. No. 6,327,476 System and method for wireless voice and computer communications using a wireless link to a public telephone network 47 U.S. Pat. No. 6,311,071 Low-feedback compact wireless telephone 48 U.S. Pat. No. 6,308,053 Recyclable wireless telephone unit with a secured activation switch 49 U.S. Pat. No. 6,298,250 Wireless prepaid telephone system with extended capability 50 U.S. Pat. No. 6,292,675 Wireless mobile telephone system with voice-dialing telephone instruments and DTMF capability 51 U.S. Pat. No. 6,292,674 One-handed control for wireless telephone 52 U.S. Pat. No. 6,292,662 Method and system for processing telephone calls involving two digital wireless subscriber units that avoid double vocoding 53 U.S. Pat. No. 6,282,416 Voice mail deposit for wireless mobile telephone networks 54 U.S. Pat. No. 6,272,327 High power wireless telephone with over-voltage protection 55 U.S. Pat. No. 6,266,411 Method and apparatus for multiple-iteration CMEA encryption and decryption for improved security for wireless telephone messages 56 U.S. Pat. No. 6,256,516 Wireless communication device with automatic destination telephone number validity checking 57 U.S. Pat. No. 6,249,684 Wireless telephone with an ergonomic grip or handle 58 U.S. Pat. No. 6,246,868 Conversion and distribution of incoming wireless telephone signals using the power line 59 U.S. Pat. No. 6,243,593 Module for providing wireless call communication services through wire-connected telephone equipment 60 U.S. Pat. No. 6,236,857 Methods and apparatus for accessing enhanced wireless services platforms via the public switched telephone network 61 U.S. Pat. No. 6,236,326 ⚙ Method and apparatus for intelligently signaling a battery charge condition in a wireless telephone 62 U.S. Pat. No. 6,233,337 ⚙ Methods and apparatus for enhanced security expansion of a secret key into a lookup table for improved security for wireless telephone messages 63 U.S. Pat. No. 6,230,003 ⚙ Telephone calling card having a wireless receiver for receiving notification of arrived messages 64 U.S. Pat. No. 6,223,021 ⚙ Signal filtering in a transceiver for a wireless telephone system 65 U.S. Pat. No. 6,216,000 ⚙ System and method for registering wireless telephones to selected wirelines of the public switched telephone network 66 U.S. Pat. No. 6,212,403 ⚙ Wireless telephone battery charging while performing data communications 67 U.S. Pat. No. 6,212,398 ⚙ Wireless telephone that rapidly reacquires a timing reference from a wireless network after a sleep mode 68 U.S. Pat. No. 6,195,558 ⚙ Automatic reassignment of a telephone number of a wireless terminal based on location of the wireless terminal 69 U.S. Pat. No. 6,195,542 ⚙ Identification by a central computer of a wireless telephone functioning as a transaction device 70 U.S. Pat. No. 6,195,541 ⚙ Interaction of a wireless telephone with a transaction unit 71 U.S. Pat. No. 6,195,535 ⚙ High power wireless telephone with over-voltage protection disabling circuit 72 U.S. Pat. No. 6,188,888 ⚙ Charging unit and wireless telephone having multi-number call forwarding capability 73 U.S. Pat. No. 6,188,875 ⚙ Wireless telephone server system 74 U.S. Pat. No. 6,173,195 ⚙ Wireless mobile telephone adapter for automobiles 75 U.S. Pat. No. 6,169,891 ⚙ Method and apparatus for billing of wireless telephone calls 76 U.S. Pat. No. 6,163,703 ⚙ Method for registering portable unit in cordless telephone system by using both wire and wireless links 77 U.S. Pat. No. 6,163,682 ⚙ Method and apparatus for automatically extracting and retracting an antenna in a wireless telephone 78 U.S. Pat. No. 6,151,510 ⚙ Module for providing wireless call communication services through wire-connected telephone equipment 79 U.S. Pat. No. 6,151,503 ⚙ Subscriber activated wireless telephone call rerouting system 80 U.S. Pat. No. 6,149,353 ⚙ Wireless prepaid telephone system with dispensable instruments 81 U.S. Pat. No. 6,144,847 ⚙ Wireless telephone with credited airtime 82 U.S. Pat. No. 6,144,840 ⚙ Wireless telephone ring detection method for extended battery life 83 U.S. Pat. No. 6,141,570 ⚙ System and method for conserving battery energy in a wireless telephone with an integral global positioning system 84 U.S. Pat. No. 6,138,036 ⚙ Wireless telephone with voice data interface mode 85 U.S. Pat. No. 6,138,016 ⚙ Distributing location tracking functionality in wireless telephone systems 86 U.S. Pat. No. 6,138,008 ⚙ Wireless telephone menu system 87 U.S. Pat. No. 6,134,421 ⚙ RF coupler for wireless telephone cradle 88 U.S. Pat. No. 6,131,028 ⚙ Method of providing services specified by feature codes based upon location of a wireless telephone unit 89 U.S. Pat. No. 6,128,515 ⚙ Combined global positioning and wireless telephone device 90 U.S. Pat. No. 6,128,475 ⚙ Wireless telephone with sliding keyboard 91 U.S. Pat. No. 6,125,287 ⚙ Wireless telephone having an improved user interface 92 U.S. Pat. No. 6,118,981 ⚙ Wireless local loop system for radio communication between central telephone exchange and fixed subscriber 93 U.S. Pat. No. 6,115,612 ⚙ Wireless telephone system having a free period allocated to switching between two frequencies 94 U.S. Pat. No. 6,115,598 ⚙ Emergency call number identification in a wireless telephone 95 U.S. Pat. No. 6,115,412 ⚙ Spread spectrum wireless telephone system 96 U.S. Pat. No. 6,101,401 ⚙ Wireless telephone dialing method 97 U.S. Pat. No. 6,091,965 ⚙ Low-feedback compact wireless telephone 98 U.S. Pat. No. 6,091,947 ⚙ Method and apparatus for accepting and conveying a voice mail message to a mobile unit in a wireless telephone system 99 U.S. Pat. No. 6,085,109 ⚙ Wireless telephone equipment operating as a cordless and cellular telephone 100 U.S. Pat. No. 6,073,034 ⚙ Wireless telephone display system

BROAD SCOPE OF THE INVENTION

While some illustrative embodiments are shown, it is contemplated that various other embodiments and modifications can be made as would be apparent to those in the art based on this disclosure. It should be understood that the preferred embodiments pertain to general concepts that can easily be implemented by those in the art using technology known in the art.

What is claimed is:

1. A wireless child phone, comprising:
   a) a handheld phone unit with a user interface having keys and/or voice receivers;
   b) said wireless phone being configured to make calls to only a preset set of individuals;
   c) said wireless phone being configured to receive calls from only a preset set of individuals;
   d) wherein said wireless child phone does not have a common key pad with dialing keys having respective digits 0-9, neither covered nor uncovered, and has a user interface with substantially less dialing keys than said common key pad;

e) wherein the configuring of said wireless phone above in b) includes not more than six keys configured to call a preset set of callees;
f) wherein said set includes the child's parents;
g) wherein said set includes a preset other callee identified by the parent;
h) wherein said user interface includes a key pad having two adjacent keys with visual identifications for a mother and a father for visual identification by a child; and
i) wherein said phone is programmed so as to automatically direct or to redirect a call to at least one callee.

2. The wireless child phone of claim 1, wherein said child phone is remotely programmed via an external telephone and/or via an Internet Web Site, for setting said callee set of numbers and/or for setting said caller set of numbers that can call to said child phone.

3. The wireless child phone of claim 1 wherein said visual identifications for a mother and a father are directly on said keys.

4. The child phone of claim 1, wherein said adjacent keys are located substantially symmetrically about a vertical centerline of said front of said handheld unit, such that said two adjacent keys are horizontally next to one another when viewed from a front of said unit with said unit in an upright orientation.

5. The child phone of claim 4, wherein said visual identifications include text designating a mother and a father on respective ones of said keys.

6. The child phone of claim 5, wherein said visual identifications include an image or picture representation of a mother and a father on respective ones of said keys.

7. The child phone of claim 1, wherein said handheld phone unit includes a display screen that displays identifications of a mother and/or a father associated with at least one key.

8. The child phone of claim 1, including means for remote programming via the Internet for setting callee telephone numbers for said child phone.

9. The child phone of claim 1, including means for remote programming via the Internet for setting numbers that can call to said child phone.

10. The child phone of claim 1, including means for establishing a conference call with plural entities upon pressing a single dialing key.

11. The child phone of claim 1, including means for establishing a conference call with a mother and a father of a child.

12. The child phone of claim 1, wherein said phone does not include any numerical indicia on any dialing keys, and wherein said phone has not more than six dialing keys.

13. The child phone of claim 12, wherein said phone has not more than four dialing keys.

14. A method of having a child use a child phone according to claim 1, including having a child use said phone so as to selectively call the child's mother or father and so as to selectively call said present other callee identified by the parent.

15. The method of claim 12, further including having the child use said phone to select between calling the child's mother, father and an emergency callee.

16. A wireless child phone system, comprising:
a handheld phone unit with a user interface having keys and/or voice receivers;
said wireless child phone being configured to make calls to only a preset set of individuals;
said wireless child phone being configured to receive calls from only a preset set of individuals;
wherein said wireless child phone does not have a common key pad with dialing keys having respective digits 0-9, neither covered nor uncovered, and has a user interface with substantially less dialing keys than said common key pad;
wherein said user interface includes not more than six keys configured to call a preset set of callees;
wherein said set includes the child's parents;
wherein said set includes a preset other callee identified by the parent;
wherein said user interface includes visual identifications for a mother and/or a father for visual identification by a child; and
wherein said phone is programmed so as to automatically direct or to redirect a call to at least one callee.

17. The child phone of claim 16, including means for controlling said child phone remotely, wherein said means includes means to cause said child phone to automatically answer a telephone call.

18. The child phone of claim 16, including means for controlling said child phone remotely, wherein said means includes means to cause said child phone to send an audio transmission.

19. The child phone of claim 16, including means for controlling said child phone remotely, wherein said means includes means to cause said child phone to send a visual transmission.

20. The child phone of claim 16, including means for controlling said child phone remotely, wherein said means includes means for changing a callee telephone number reached by said child phone remotely.

21. The child phone of claim 20, wherein said means for changing a callee telephone number includes an Internet Web Site.

22. A wireless child phone system, comprising:
a handheld phone unit with a user interface having keys and/or voice receivers;
said wireless child phone being configured to make calls to only a preset set of individuals;
said wireless child phone being configured to receive calls from only a preset set of individuals;
wherein said wireless child phone does not have a common key pad with dialing keys having respective digits 0-9, neither covered nor uncovered, and has a user interface with substantially less dialing keys than said common key pad;
wherein said user interface includes not more than six keys configured to call a preset set of callees;
wherein said set includes the child's parents;
wherein said set includes a preset other callee identified by the parent;
wherein said user interface includes visual identifications for visual identification by a child; and
wherein said phone is programmed so as to automatically direct or to redirect a call to at least one callee.

23. The child phone of claim 22, wherein said phone is programmed so as to automatically direct a call to a child's mother or father upon activation.

24. The child phone of claim 22, wherein said phone is programmed so as to automatically direct an emergency call initially to a first callee and to later redirect the call to an emergency callee.

25. The child phone of claim 22, wherein said phone is configured so as to call a child's mother or father upon the child verbally saying the parent's identification or name.

26. A method of having a child communicate with a parent or other entity, comprising:
- providing a child with a handheld wireless child phone having a handheld phone unit with a user interface having keys and/or voice receivers, wherein said wireless child phone does not have a common key pad with dialing keys having respective digits 0-9, neither covered nor uncovered, and has said user interface configured with substantially less dialing keys than said common key pad;
- providing the handheld phone unit with not more than six dialing keys, and no dialing keys having numerical indicia of a common phone key pad;
- providing the handheld phone unit with a visual or textual identification of a mother and/or a father to be called via said child phone;
- causing said child phone to only achieve outgoing telephone calls to a preset set of callees, including the mother and/or the father of the child and including a set of other callees selected by the parent of the child user;
- causing said child phone to only achieve incoming telephone calls from a preset set of allowed callers, including the mother and/or the father of the child and including a set of other callers selected by the parent of the child user; and causing said phone to automatically direct or to redirect a call to at least one callee.

27. The method of claim 26, further including remotely changing a telephone number for at least one of said callees.

28. The method of claim 27, further including remotely changing the telephone number for said at least one of said callees remotely via the Internet.

29. The method of claim 28, further including remotely changing a telephone number for at least one of said allowed callers remotely via the Internet.

30. The method of claim 26, further including providing said child phone with two adjacent keys with associated visual identifications for identification of at least one parent by a child.

31. The method of claim 26, further including remotely controlling said child phone.

32. The method of claim 31, further including having a parent remotely control said child phone via the Internet.

33. The method of claim 26, further including remotely controlling said child phone to send an audio transmission or to send an image transmission.

34. The method of claim 26, further including automatically directing a call upon activation, upon opening said phone, upon verbal command, or upon pressing a key.

35. The method of claim 26, further including having a child wear said child phone on the child's body using a strap.

36. A wireless child phone system, comprising:
- a handheld phone unit with a user interface that includes less than the number of user inputs than on a common ten-digit telephone key pad, wherein said wireless child phone does not have a common key pad with dialing keys having respective digits 0-9, neither covered nor uncovered, and has said user interface configured with substantially less dialing keys than said common key pad;
- said phone being configured to make calls to only a preset set of entities;
- said phone being configured such that each single input establishes a call to a preset one of said entities;
- said phone being configured such that said entities include:
  a) a parent of a child user of the phone;
  b) an emergency entity;
  c) another entity selected by the parent of the child user;
- said phone being configured such as to change a telephone number called by said child phone activated by at least one of said inputs, such that calling of at least one of said entities via the respective input results in calling of a different number;
- said phone being configured to receive calls from only a preset set of individuals; and
- wherein said phone is programmed so as to automatically direct or to redirect a call to at least one callee.

37. The child phone of claim 22, further including said wireless child phone being configured to receive calls from only a preset set of individuals.

38. The method of claim 26, further including causing said child phone to only achieve incoming telephone calls from a preset set of allowed callers, including the mother and/or the father of the child and including a set of other callers selected by the parent of the child user.

39. The child phone of claim 22, wherein said child phone is configured to connect to the Internet via browser software and is configured to limit site access to a number of preset URLs and/or Web Sites.

40. The child phone of claim 22, wherein said child phone is configured to limit email communications such as to send email communications to only a preset set of individuals and/or to receive email communications from only a preset set of individuals.

41. The method of claim 26, further including configuring said child phone to connect to the Internet via browser software and limiting site access to a number of preset URLs and/or Web Sites.

42. The method of claim 26, further including limiting email communications such as to send email communications to only a preset set of individuals and/or to receive email communications from only a preset set of individuals.

* * * * *